United States Patent [19]

Kannan et al.

[11] 4,262,052
[45] Apr. 14, 1981

[54] FOAMED COMPOSITE MATERIAL AND PRODUCTION THEREOF

[75] Inventors: Akira Kannan; Yoshiaki Kitamori, both of Nara, Japan

[73] Assignee: Sekisui Kaseihin Kogyo Kabushiki Kaisha, Nara, Japan

[21] Appl. No.: 15,591

[22] Filed: Feb. 27, 1979

[30] Foreign Application Priority Data

Feb. 27, 1978 [JP] Japan .................................. 53-22683

[51] Int. Cl.$^3$ .......................... B32B 5/18; B32B 5/22; B32B 5/32
[52] U.S. Cl. .................................... 428/306; 428/315; 428/327
[58] Field of Search ............................. 521/56, 59, 60; 428/304, 306, 315, 327, 482; 264/46.6, 46.4, 45.4

[56] References Cited

U.S. PATENT DOCUMENTS

| | | | |
|---|---|---|---|
| 3,256,133 | 6/1966 | Wright et al. ........................ | 428/315 |
| 3,391,823 | 7/1968 | Tijms ................................... | 428/315 |
| 3,743,611 | 7/1973 | Muroi et al. .......................... | 521/56 |
| 3,900,640 | 8/1975 | Vecchiotti ............................ | 428/482 |
| 3,959,189 | 5/1976 | Kitamori ............................... | 521/59 |
| 4,168,353 | 9/1979 | Kitamori ............................... | 521/60 |

Primary Examiner—William J. Van Balen
Attorney, Agent, or Firm—Armstrong, Nikaido, Marmelstein & Kubovcik

[57] ABSTRACT

The present invention relates to a foamed composite material serviceable for light weight constructional material or thermal insulating material having a high mechanical strength, particularly, high tensil strength. The foamed composite material is made by lining a surface of specific plastic foam with a lining material comprising an unsaturated polyester and vinyl monomer. The specific plastic foam is obtained by expanding thermoplastic resin particles consisting of polyolefin, vinyl aromatic polymer and graft polymer formed by graft-polymerization of vinyl aromatic monomer onto the polyolefin or otherwise, which may be produced by polymerizing a vinyl aromatic monomer impregnated into particles of polyolefin to graft the monomer onto the backbone of polyolefin. The vinyl monomer contained in the lining material penetrates into the plastic foam and hardens to bind strongly the lining layer and the plastic foam. The coated plastic foam of the present invention is useful to material for vessel, float, tank, building and the like.

13 Claims, 1 Drawing Figure

FOAMED COMPOSITE MATERIAL AND PRODUCTION THEREOF

BRIEF DESCRIPTION OF THE DRAWING

This drawing is a FIGURE of the specimen for the shear peeling test of the formed composite material in Example 1 through 6.

DETAILED DESCRIPTION OF THE INVENTION

Figure 1:
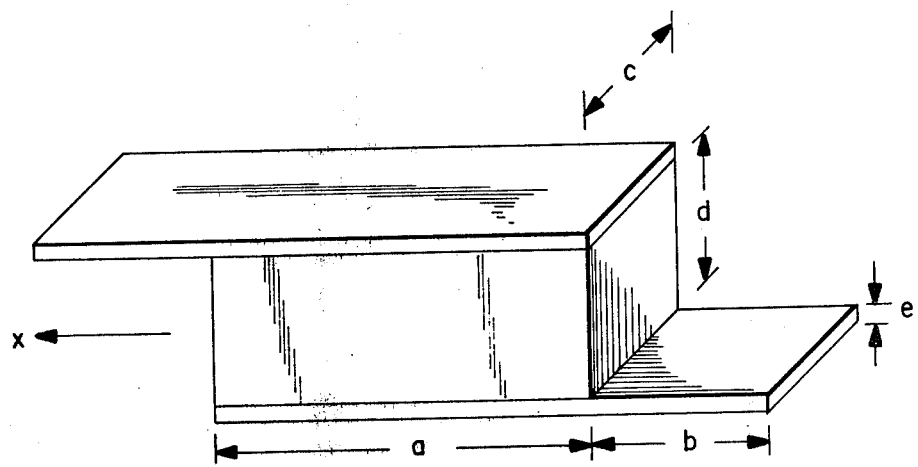

The present invention relates to a foamed composite material and the method of its production.

Many trials to obtain a light weight constructional material or a thermal insulating material having a high mechanical strength had been done. For example, surface of molded plastic foam such as polystyrene foam, polyolefin foam, polyurethane foam and the like was coated with lining material such as fibrous reinforced plastic, particularly unsaturated polyester resin reinforced with glass fiber to give an increased rigidity. However, any satisfactory result had not been obtained yet from the trials.

A polystyrene foam is suitable for the core because of the desirable rigidity and good shape retention, but the said foam has a defect to be solubilized by a vinyl monomer such as styrene included in unsaturated polyester containing lining material. A polyolefin foam such as polyethylene, polypropylene and the like is not solubilized by the vinyl monomer in the lining material. However, a polyolefin is flexible and poor in shape retention and has low adhesive strength to the lining material. Therefore the polyolefin foam is unsuitable for the core to be coated with lining material. A polyurethane foam has high rigidity and good shape retention but is shock-brittle and crumbly.

Therefore a foamed composite material obtained by using the polyurethane foam as the core has a defect that the polyurethane foam is liable to be powdered by shock, vibration and the like given to the said composite material during use. As the result of the above, the effect of thermal insulating material is lost. Further the polyurethane foam is liable to be hollowed by hand or foot in the lining process.

A polyacryl foam is also liable to be powdered by shock or vibration as like as polyurethane foam. Further it is difficult to make a foam having low density and the foam is very expensive.

It has been found that a coated plastic foam having desirable properties was obtained by using a specific plastic foam as a core.

According to one aspect of this invention, there is provided a foamed composite material comprising a foamed thermoplastic resin mass and a surface layer, the foamed thermoplastic resin means including (a) polyolefin,
(b) vinyl aromatic polymer and
(c) graft polymer which is formed by graft-polymerizing vinyl aromatic monomer onto the backbone of polyolefin, the surface layer being formed by curing the mixture of unsaturated polyester and vinyl monomer, and the said foamed thermoplastic resin mass and the said surface layer being bonded as a result of an action of the vinyl monomer of the mixture penetrating into the vinyl aromatic polymer near the surface of the foamed mass and curing therein.

According to another aspect of the invention, there is provided a process for preparing a foamed composite material which comprises lining at least a part of surface of a foamed thermoplastic resin mass which is obtained by impregnating a vinyl aromatic monomer into particles of polyolefin, graft-polymerizing the monomer onto the backbone of the polyolefin at least partially and expanding the resultants, with lining material containing unsaturated polyester and vinyl monomer and curing the coated material.

The foamed thermoplastic resin to be used in the present invention is obtained by expanding a thermoplastic resin with a foaming agent, wherein the thermoplastic resin may be produced by the polymerization of the vinyl aromatic monomer under the condition that the vinyl aromatic monomer is impregnated into the particles of the polyolefin. For example, there may be used thermoplastic resin particles produced by suspending the polyolefin resin particles and the vinyl aromatic monomer in an aqueous medium, effecting polymerization thereof and impregnating resulting polymer particles with foaming agent.

Examples of the polyolefin may be polyethylene, polypropylene, chlorinated polyethylene, polyisobutyrene, polybutene, polybutadiene, ethylene-propylene copolymer, ethylene-vinyl chloride copolymer, ethylene-methyl methaethylene-α-olefin-polyene copolymer, ethylene-propylene rubber, and the like or the mixture thereof. In the cases of the copolymers or the mixtures, contents of the polyolefin are desirably more than 50% by weight. In case the polyolefin resin may be ethylene-α-olefin-polyene copolymer, there may be exemplified as α-olefin the propylene, butene, pentene, isoprene, hexene, or the mixture thereof, and as polyene, hexadiene-1,4, hexadiene-1,5, heptadiene-1,6, 2-methylpentadiene-1,4, octadiene-1,9, 6-methyl heptadiene-1,5, 9-ethyl undecadiene-1,9, octatriene-1,4,7, ethylidene norbornane, dicyclopentadiene, cyclooctadiene-1,4, cyclohexadiene, and the like. Resins comprising 20 to 80% by weight of ethylene, 20 to 80% by weight of α-olefin, and 0.5 to 20% by weight of polyene compound may be suitably used.

On the other hand, examples of the vinyl aromatic monomer are the monomers such as styrene, α-methylstyrene, ethylstyrene, chlorostyrene, bromostyrene, vinyltoluene, vinylxylene, or isopropylxylene, or the mixture thereof, or a mixture of these vinyl aromatic monomer and a monomer co-polymerizable with the vinyl aromatic monomer such as methyl methacrylate or divinylbenzene, diallyl phthalate, acrylonitrile, ethylene glycol dimethacrylate, vinyltriethoxysilane, said mixture containing these vinyl aromatic monomers by more than 50% by weight.

The above polyolefin resin particles and the vinyl aromatic monomers may be reacted under heat in an aqueous lauroyl peroxide, t-butyl peroxy-2-ethyl hexanate, azobisisobutyronitrile, dicumyl peroxide, t-butyl cumyl peroxide and the like. Of these catalyst, dicumyl peroxide and t-butyl cumyl peroxide may be used as cross-linking agent and used together with material such as 1,2-polybutadien, if necessary. In this case, the vinyl aromatic monomers penetrate into the polyolefin resin particles to become polymerized to give a thermoplastic resin particles having specific properties, a part of which is a graft polymer formed by the graft-polymerization of the vinyl aromatic monomer onto the backbone of polyolefin or a cross-linked polymer thereof and other part of which is homopolymerization product of the vinyl aromatic monomer and is entangled with the polyolefin. In the above reactions, there are generally used 20 to 80% by weight of polyolefin and 80 to 20% by weight of vinyl aromatic monomer are used. When the amount of the vinyl aromatic monomer is smaller than the above range, a foam having high expansion ratio can not be obtained, the shape retention property of the foam is not satisfactory to be used as core and the adhesive strength of the foam to the polyester lining layer is inferior. To the contrary, when the amount of the vinyl aromatic monomer is excessive, the properties such as oil resistance, heat resistance, solvent resistance, etc. of the resulting foams are deteriorated. The most suitable proportions of these compositions are 50 to 30% by weight of polyolefin resin particles and 70 to 50% by weight of vinyl aromatic monomers.

When the above thermoplastic resin particles are impregnated with the foaming agent such as propane, butane, pentane, hexane, methyl chloride, or dichlorofluoromethane, under pressure in an aqueous suspension according to conventional method, there are obtained the foaming thermoplastic resin particles. When these particles are subjected to pre-expanding and the particles obtained in pre-expanding is heated to foam and fuse in a mold, a molded thermoplastic foam can be produced. Alternatively, molded foam may be obtained by secondary processing of the foamed sheet, plate or rod obtained by extrusion foaming of the above thermoplastic resin particles incorporated with a foaming agent on an extruder.

The foamed composite material of the present invention may be obtained by lining a lining material including unsaturated polyester resin and vinyl monomer at least a part of the surface of the above thermoplastic foam.

The said unsaturated polyester may be conventional one, which is produced by the condensation polymerization of polybasic acid containing at least partially unsaturated aliphatic polybasic acid such as maleic acid, fumalic acid and the like and polyvalent alcohol such as diethylene glycol, dipropylene glycol and the like.

The above polybasic acid and the polyvalent alcohol are subjected to condensation polymerization reaction to make condensation polymerized resin, to which vinyl monomer is added about 6 to 130 parts by weight of vinyl monomer based on 100 parts by weight of the condensation polymerized resin and a reinforcement such as glass fiber may be added, if necessary. The amount of vinyl monomer to be added is variable depending upon the degree of fluidity and viscosity of the polyester desired. This polyester resin is liquid form of a low viscosity, and usually it is blended with reinforcements such as glass fibers. A coated plastic material may be produced by laminating polyester resin and glass fiber on the molded plastic foam without premixing the both. The glass fiber may have a form of cloth. The resin may be blended with polymethyl methacrylate, polyethylene terephthalate, other fiber such as carbon fiber, boron fiber and the like, or if necessary pigments, dyestuff, and the like. The vinyl monomer affects as diluent of polyester and as hardner of the lining material. Examples of the vinyl monomer as styrene, α-methylstyrene, vinyl acetate, methacrylate, diallyl phthalate, α-chlorostyrene, vinyltoluene, divinylbenzene, acrylic acid ester, diallylbenzenephosphonate, N-vinylpyrrolidone, maleimide, triallyl cyanurate, triallyl phosphate, and a mixture of them. Generally, styrene is frequently employed.

Coating the surface of the foamed thermoplastic resin with the lining material containing the polyester resin and vinyl monomer and curing may be carried at room temperature. In this case it is desirable to use the catalysts such as the methyl ethyl ketone peroxide and to use cobalt naphthenate as a reaction accelerator together accordingly. The curing reaction may be carried out under heating. In this case alike, a catalyst such as benzoyl peroxide is used to carry out the reaction. As a curing catalyst, there may be exemplified in addition to the above cyclohexanone peroxide, lauroyl peroxide, di-t-butyl peroxide, t-butyl perbenzoate, or cumene hydroperoxide.

In case of the curing under heat, it is preferred to effect reaction at a temperature not exceeding about 70° C. when polyethylene is used, and not exceeding 100° C. when polypropylene is used, respectively as polyolefin resin.

According to the process of the present invention, the surface of the foamed thermoplastic resin is coated with the lining material containing unsaturated polyester and vinyl monomer, said vinyl monomer is cured after penetrating from the surface into the interior of the foamed thermoplastic resin to give a coated plastic foam having a strong bonding between the foamed thermoplastic resin and the lining material layer. This is surmised to be the result that, because the polymer of the vinyl aromatic monomer which constitutes the foamed thermoplastic resin is swelled by the vinyl monomer contained in the above-described lining material and is partially dissolved, the vinyl monomer penetrates into the inside of the foam and cures to give the anchor effect. However, even if the polymer of the vinyl aromatic monomer should be dissolved, the foam does not change in shape or collapse. Since the vinyl aromatic monomer and the polyolefin resin is graft polymerized or graft polymerized with cross-linking, the resulting foamed mass has strong resistance to solvents, with only a slight swelling of the vinyl aromatic polymer portion. Even if the said portion is partially dissolved, the molding, which is kept in a fixed shape by the outside surface of the polyolefin resin particles, does not show deformation or collapse. In the case of the plastic foam made from the polyolefin and the vinyl aromatic polymer physically mixed, the vinyl aromatic polymer is dissolved by the vinyl monomer in the lining material to cause deformation of the foam and to collapse the shape, so such a foam is not suitable as a core of the composite material having unsaturated polyester resin surface layer.

The foamed thermoplastic resin of the present invention may be made by expanding the thermoplastic resin particles formed by graft polymerization or graft polymerization with crosslinking after the impregnation of the vinyl aromatic monomer into the polyolefin resin particles as above. Therefore, it has moderate rigidity as in the case of the polystyrene foam, good shape retaining property, light weight, flexibility satisfactory for bending when manufactured and extremely good processability for engraving. Furthermore, as it is not dissolved by the vinyl monomer in the lining material, it is easily coated and covered with polyester resin-containing lining material such as reinforced plastics without any collapse of shape, so that the coated plastic foam having rigid bonding between the core material and the reinforced plastic layer is obtainable. In the lining of the polyester resin-containing lining material, the lining may be thickened by repeating the coating. Though the lining thickness may vary depending on the kind and the size of the molding, generally the lining in the thickness of several mm to ten and several mm may make rigid coated material.

The foamed composite material of the present invention, in which the thermoplastic foam is used as a core material, is extremely light in weight, and as the polyester resin layer particularly reinforced with glass fiber is extremely rigid, it is applicable to vessel material, float, various kinds of tank constructional material, building material, and various other uses.

Practical and presently preferred embodiments of the present invention are illustratively shown in the following Examples. All quantities are on a weight basis unless otherwise indicated.

EXAMPLE 1

A. Production of thermoplastic resin foamed molding

Into an autoclave, there are charged the pure water (250 parts) and magnesium pyrophosphate (1 part), sodium dodecyl benzene sulfonate (0.4 part) and polyethylene resin particles (trade name MILASON ACE-30N available from Mitsui Polychemical Co.) (80 parts) and are suspended. The suspension is stirred at a rate of stirring of 320 r.p.m. Aside from the above there are dissolved as polymerizing catalysts benzoyl peroxide (0.6 part) and t-butyl-perbenzoate (0.1 part) in styrene monomer (120 parts) to make a monomer solution. Said solution is slowly added dropwise to the above aqueous medium to have it absorbed in the polyethylene resin particles, during which the reaction mixtures are kept at the temperature of 80° C. for 8 hours and kept at 120° C. for 2 hours to effect polymerization, after which the reaction product is cooled and taken out, followed by washing with water, and drying.

The graft ratio of the resulting polymer is 2.8 percent, which is determined by the following method:

The Determination of a Graft Ratio of the Graft Polymer (1) A sample of the resultant polymer ($W_0$) is solubilized in boiling toluene for 16 hours and filtered. The residue is dried until its weight becomes constant ($W_1$).

(2) The filtrate is dispersed into ethyl acetate to give precipitate and the precipitate is filtered, dried and then weighed ($W_2$).

(3) The graft ratio is calculated by the following formula:

$$\frac{(W_1 + W_2) - W_0}{W_0}$$

wherein is percent of olefin moiety in graft polymer.

Aside, into the above autoclave water (200 parts) and sodium dodecylbenzenesulfonate (0.06 part) and toluene (4 parts) are charged and stirred at 320 r.p.m. To the mixture the ethylene-styrene copolymer particles (200 parts) obtained in the above step are charged, and additionally butane (40 parts) is charged under pressure as a foaming agent. The temperature is further elevated to 80° C., and stirring is continued for 5 hours, after which the reaction product is cooled and taken out. The thus obtained foaming resin particles are subjected to steam heating for 2 minutes, 1 minute and 40 seconds respectively for pre-expanding and there are obtained the foamed particles having utterly no mutual blocking among them, with the density of 0.02 g/cm³, 0.03 g/cm³, 0.04 g/cm³. These foamed particles are kept at a room temperature for 24 hours, then they are put in mold cavities of 100 mm×600 mm×900 mm, which is closed but not sealed and heated at a steam pressure of 0.08 kg/cm² for 60 sec., after which they are cooled with water for 10 minutes.

B. Production of foamed composite material (coated plastic foam)

Maleic anhydride (98 parts), phthalic anhydride (148 parts), ethylene glycol (62 parts) and propylene glycol (76 parts) are mixed, and subjected to condensation polymerization reaction to obtain a polyester resin, to which styrene (192 parts) is added to give liquid form polyester molding resin. The mixture (1000 parts) is incorporated with glass fiber (about 400 parts), and further with methyl ethyl ketone peroxide and small amounts of cobalt naphthenate. The thus formed composition is repeatedly applied at room temperature to the both surfaces of a specimen cut from plastic foam of the above Example 1A to form a lining layer having a thickness of about 3 mm, which is strongly bonded to the surface of the foam. The obtained coated plastic foam has light weight and has extremely high mechanical strength.

C. The shear peeling test of the coated plastic foam

The coated plastic foams prepared in Example 1B are cut at both ends as shown in FIG. 1 to make specimens, wherein a, b, c, d and e are 63 mm, 30 mm, 30 mm, 25 mm and 3 mm respectively and (1) represents plastic foam and (2) represents lining layer.

The specimens are subjected to the peeling test by pulling the arrow X at the rate of 20 mm/min. to determine the shear peeling strength. TENSHIRON of Toyo Boald Winn Co., Ltd. is used as a test instrument. The result is shown in Table 1.

D. Degree of distortion at drop test

Specimens are prepared by lining the plastic foam obtained from Example 1A (200 mm×200 mm×50 mm) with lining material given in Example 1B in two plies.

The specimens are subjected to the drop test by Drop Impact Test Instrument ST-320SB of Yoshida Seiki Co., Ltd. to determine the degree of distortion. The condition of the test is as follows:

| | | |
|---|---|---|
| temperature: | 22 ± 2° C., | drop hight: 40 cm |
| drop interval: | 20 sec., | static stress: 0.07 kg/cm² |
| detector: | Visigraph Type 5L of Sanei Sokki Kabushiki Kaisha | |

The result is shown in Table 1.

EXAMPLE 2

Polypropylene having a diameter of 1 mm to 3 mm pelletized with extruder (MI value 8.0) (40 parts) is dispersed in a system comprising water (150 parts), magnesium pyrophosphate produced by metathetical reaction (0.2 part) and sodium dodecyl benzene sulfonate (0.02 part). Aside a mixed solution is prepared by dissolving benzoyl peroxide (0.3 part), dicumyl peroxide (0.5 part) and 1,2-polybutadiene (0.5 part) in styrene monomer (60 parts), and the mixture is dropwise added to the above polypropylene dispersion as maintained at 85° C. over 7 hours. After completion of the dropwise addition, further reaction is made at 140° C. for 4 hours, and then the reaction product is cooled to obtain polymer particles.

Thereafter, the resulting polymer particles (100 parts), water (100 parts) and sodium dodecyl benzene sulfonate (0.02 part) are charged in a pressure-resisting vessel, into which butane (20 parts) is charged under pressure and the contents are maintained at 80° C. for 6 hours. Then, the product is cooled to 30° C., after which it is dehydrated and dried to obtain thermoplastic foam particles. These particles are subjected to pre-expanding, and then filled in a metal mold for molding, into which steam of about 5 kg/cm² (gauge pressure) is introduced. Thereafter, the product is cooled and taken out from the mold to obtain foamed molding compound.

By the use of the above molded foam, the polyester resin-containing lining material is coated and covered in the same manner as in the method described in the foregoing Example 1B to obtain a coated plastic foam.

The graft ratio of the resultant determined by the same manner as in Example 1A is 5.8 percent.

EXAMPLE 3

A propylene (97%)-ethylene (3%) random copolymer being pelletized into 1 mm to 3 mm diameter with an extruder (40 parts) are dispersed in a system comprising water (150 parts), magnesium pyrophosphate produced by metathetical reaction (0.2 part) and sodium dodecylbenzenesulfonate (0.02 part), to which, with the inside of the system being maintained at 85° C., a mixed solution comprising styrene monomer (60 parts), benzoyl peroxide (0.3 part), dicumyl peroxide (0.5 part) and 1,2-polybutadiene (0.6 part) is dropwise added over 7 hours. After completion of the dropwise addition, further reaction is made at 140° C. for 4 hours, and the product is cooled to obtain polymer particles. Then, the polymer particles (100 parts), water (100 parts) and sodium dodecylbenzenesulfonate (0.02 part) are charged in the pressure-resisting vessel, into which butane (20 parts) is charged under pressure and the system is maintained at 80° C. for 6 hours. Thereafter, the contents are cooled to 30° C. and dried to obtain foamable thermoplastic resin. The resulting resin is heated with superheated steam into the form of the preexpanding particles, and pilled in a metal mold for molding, into which superheated steam at about 3 kg/cm² (gauge pressure) is introduced. After cooling, the product is taken out from the metal mold to obtain a molded plastic foam.

On this plastic foam used as a core material, polyester resin-containing lining material is coated and covered in the same manner as that described in the above Example 1B to obtain a coated plastic foam.

The graft ratio of the resultant foam is 7.6 percent.

EXAMPLE 4

Ethylene (65 mol%)-propylene-dicyclopentadiene (1.2 mol%) copolymer (30 parts) is suspended in water containing polyvinyl alcohol and sodium dodecylbenzenesulfonate in an autoclave, which is heated to 85° C. To this mixture, styrene monomer solution (70 parts) comprising benzoyl peroxide (0 .3 part) and dicumyl peroxide (1 part) is dropwise added over 7 hours. 30 minutes after completion of the dropwise addition, the system was subjected to elevated temperature to 90° C., at which it is maintained for 1 hour. Thereafter, the reaction mixture is further heated to 140° C. and maintained for 3 hours to allow the reaction to come to completion. Thereafter, the product is cooled and the thermoplastic resin particles are separated.

The thus obtained thermoplastic resin particles (100 parts), together with water (100 parts) and sodium dodecylbenzenesulfonate (0.02 part), is charged in a pressure-resisting vessel, into which n-butane (20 parts) is charged under pressure. The mixture is maintained at 85° C. for 8 hours, after which it is cooled to give foamable thermoplastic resin particles. These particles are subjected to pre-expanding and then formed into a molded plastic foam in the same manner as in the above-described Example.

On this molded plastic foam used as a core material, polyester resin-containing lining material is covered by coating in the same manner as that given in the foregoing Example 1B to give coated plastic foam.

The graft ratio of the resultant is 33 percent.

EXAMPLE 5

Polyethylene resin particles available from SUMITOMO CHEMICAL Co., Ltd. by the trade name of SUMIKA SEN G 701 (20 parts), magnesium pyrophosphate (0.2 part), sodium dodecylbenzenesulfonate (0.02 part) and water (150 parts) are charged into an autoclave, dispersed, and stirred at 80° C. Besides, benzoil peroxide (0.4 part) and t-butyl perbenzoate (0.1 part) are solubilized in styrene monomer (80 parts). The solution is added dropwise to the above aqueous dispersion at 80° C. for 8 hours and then polymerized at 120° C. for 2 hours to give polymer particles.

The polymer particles (100 parts), sodium dodecylbenzenesulfonate (0.04 part) and toluene (2 parts) are charged into autoclave, butane (10 parts) and propane (5 parts) are pressed into the autoclave with stirring and then kept at 60° C. for 7 hours. After the content is cooled at 25° C., it was taken out from the autoclave to give an expandable thermoplastic resin particles and then pre-expanded. After 24 hours from pre-expanding, the said particles is filled in a mold and pressed by steam of 0.5 kg/cm² to give a molded plastic foam.

The graft ratio of the resultant is 2.4 percent.

EXAMPLE 6

Ethylene-vinyl acetate copolymer (40 parts), magnesium pyrophosphate (0.2 part), sodium dodecylphosphate (0.02 part) and water (100 parts) are charged into autoclave, dispersed and kept at 75° C. with stirring. Benzoyl peroxide (0.3 part) and dicumyl peroxide (0.4 part) are solubilized in the mixture of styrene monomer (45 parts) and acrylonitrile monomer (15 parts). The above solution is added dropwise over 5 hours, kept at 140° C. for 3 hours and then polymerized to give polymer particles.

The polymer particles (90 parts), water (100 parts) and sodium dodecylbenzenesulfonate (0.02 part) and toluene (3 parts) are charged into autoclave and kept at 80° C. for 6 hours with stirring to give an expandable thermoplastic resin particles. After pre-expanding, the particles are charged in a mold and heated by steam of 0.8 kg/cm² for 60 sec. to give molded foam.

The graft ratio of the resultant is 22 percent.

TABLE 1

| foamed composite material | density of foam core (g/cm³) | shear peeling strength | degree of destortion (%) |
| --- | --- | --- | --- |
| coated foam of Example 1B | 0.04 | 30.5 | 4 |
|  | 0.03 | 28.3 | 5 |
|  | 0.02 | 21.6 | 7 |
| coated foam of Example 2 | 0.04 | 29.4 | 5 |
|  | 0.03 | 27.5 | 6 |
| coated foam of Example 3 | 0.04 | 31.3 | 5 |
|  | 0.02 | 22.5 | 9 |
| coated foam of Example 4 | 0.04 | 28.1 | 3 |
|  | 0.03 | 25.9 | 4 |
| coated foam of Example 5 | 0.04 | 32.2 | 6 |
|  | 0.02 | 20.1 | 8 |
| coated foam of Example 6 | 0.04 | 34.0 | 6 |
|  | 0.03 | 30.0 | 9 |
| coated polyurethane foam | 0.03 | 9.4 | 55 |
| coated polyacryl foam | 0.04 | 19.6 | 43 |
| coated polyethylene foam | 0.04 | 6.3 | 2 |

In peeling the lining layers, the coated foamed of Example 1B is sheared at foam core portion and the other cases are peeled substantially at interface between core and lining layer, which showes the coated plastic foams of the present invention have higher shear peeling strength than that of the coated polyurethane foam, the coated polyacryl foam or the coated polyethylene foam.

As the results of our examination, we have found that it is preferable to use as core a foamed thermoplastic resin mass comprising graft polymer having graft ratio of at least one percent for obtaining strong bonding between surface layer and foamed core.

What we claim is:

1. A foamed composite material comprising a foamed thermoplastic resin mass and a surface layer, said foamed thermoplastic resin mass comprising:
   (a) polyolefin;
   (b) vinyl aromatic polymer; and
   (c) graft polymer formed by graft polymerizing a vinyl aromatic monomer onto the backbone of said polyolefin; and said surface layer comprising
   (d) unsaturated polyester, and
   (e) vinyl monomer, said surface layer formed by curing a mixture of said unsaturated polyester and said vinyl monomer; said foamed composite material being formed by bonding said foamed thermoplastic resin mass and said surface layer, said bonding being the result of an action of said vinyl monomer penetrating into said vinyl aromatic polymer near a surface of said foamed thermoplastic resin mass and curing therein.

2. A foamed composite material as in claim 1, wherein said polyolefin is formed into particles and further wherein said thermoplastic resin is produced by the polymerization of said vinyl aromatic monomer so that said vinyl aromatic monomer is impregnated into said polyolefin particles.

3. The foamed composite material according to claim 1, wherein the polyolefin is one selected from the group consisting of polyethylene, polypropylene, chlorinated polyethylene, ethylene-propylene copolymer, ethylenevinyl acetate copolymer, ethylene-α-olefin-polyene copolymer, and the mixture thereof.

4. The foamed composite material according to claim 1, wherein the vinyl aromatic polymer is a homopolymer or a copolymer of vinyl aromatic monomer selected from the group consisting of styrene, α-methylstyrene, ethylstyrene, chlorostyrene, bromostyrene, vinyltoluene, vinylxylene and isopropyl xylene; the said copolymer comprising at least 50 percent by weight of the said vinyl aromatic monomer moiety or the mixture thereof.

5. The foamed composite material according to claim 1, wherein the foamed thermoplastic resin comprises 20 to 80 percent by weight of the polyolefin and 80 to 20 percent by weight of the vinyl aromatic polymer.

6. The foamed composite material according to claim 1, wherein unsaturated polymer comprises maleic acid or fumalic acid moiety.

7. The foamed composite material according to claim 1, wherein the vinyl monomer is one selected from the group consisting of styrene, α-methylstyrene, vinyl acetate, methyl methacrylate, diallyl phthalate, chlorostyrene, vinyltoluene, divinylbenzene, acrylic acid ester, diallylbenzenephosphonate, N-vinylpyrrolidone, maleimide, triallyl cyanurate, triallyl phosphate and the mixture thereof.

8. The foamed composite material according to any one of claims 1, 2, 3, 4, 5, or 7 wherein the surface layer comprises a glass fiber additionally.

9. The foamed composite material according to claim 1, wherein the said material is used for a float.

10. The foamed composite material according to claim 1, wherein the said material is used as a constructional material for a boat.

11. The foamed composite material according to claim 1, wherein the said material is used as a constructional material for a tank.

12. The foamed composite material according to claim 1, wherein the said material is used as a constructional material for a building.

13. The foamed composite material according to claim 1, wherein the same material is used as a material for a vessel.

* * * * *